United States Patent [19]

Castoe

[11] 4,176,435

[45] Dec. 4, 1979

[54] APPARATUS FOR REMOVING ROCKER ARMS

[76] Inventor: John H. Castoe, 10234 McVine St., Sunland, Calif. 91040

[21] Appl. No.: 871,816

[22] Filed: Jan. 24, 1978

[51] Int. Cl.[2] .............................................. B23P 19/04

[52] U.S. Cl. .............................................. 29/220

[58] Field of Search .................. 29/220, 219, 215, 267

[56] References Cited

U.S. PATENT DOCUMENTS

| | | | |
|---|---|---|---|
| 1,438,791 | 12/1922 | Seppmann | 29/220 |
| 2,627,653 | 2/1953 | Wisner | 29/220 |

FOREIGN PATENT DOCUMENTS

| | | | |
|---|---|---|---|
| 605751 | 7/1948 | United Kingdom | 29/220 |
| 714929 | 9/1954 | United Kingdom | 29/220 |

*Primary Examiner*—James L. Jones, Jr.
*Attorney, Agent, or Firm*—Christie, Parker & Hale

[57] ABSTRACT

Apparatus for removing a rocker arm of a valve mechanism in an automobile engine includes an elongated open-ended tubular sleeve having a U-shaped working face at one end and a slot extending inwardly from the working face of the sleeve. The slot allows the sleeve to be slid sideways around a rocker arm to position the working face of the sleeve above a valve spring located below the rocker arm. The slot provides clearance between the sleeve and the cam shaft which activates the rocker arm. A leverage arm pivots about a transverse axis at an end of the sleeve opposite the working face. A first portion of the leverage arm extends away from one side of the transverse axis and engages the underside of a cross-bar secured to the cylinder head and extending parallel to the cam shaft. A second portion of the leverage arm extends away from an opposite side of the transverse axis. A force applied downwardly to the second portion of the leverage arm forces the opposite end of the leverage arm against the cross-bar which enables the working face of the sleeve to apply downward pressure to compress the valve spring, allowing the rocker arm to be removed.

8 Claims, 4 Drawing Figures

APPARATUS FOR REMOVING ROCKER ARMS

BACKGROUND

This invention relates to apparatus for removing rocker arms in a cam-activated valve mechanism of an engine. The tool also can be used to remove the valve springs of the valve mechanism in preparation for removing the valves.

The job of overhauling an automobile engine is time-consuming and costly to the automobile owner. The job of disassembling and reassembling certain automobile engines is especially tedious and time-consuming when there are no tools available to aid the repairman in accomplishing certain necessary steps in the repair process. For example, to remove the valves in an overhead cam engine manufactured by Nissan Motor Company, Ltd., Tokyo, Japan (Datsun), or other similar engines, the cam shaft sprocket is removed to free the timing chain. The sprocket is removed so that the cylinder head can be removed from the engine block. The rocker arm cover is removed to expose the top of the valve mechanism. The valve system has pivot-type rocker arms which are activated directly by rotation of the cam shaft. To remove the valves, the rocker arms and valve springs are initially removed to free the valves for removal. To remove the rocker arms, each valve spring engaged with the rocker arm first must be compressed so the rocker arm can be slipped out of engagement with the valve rocker guide and the cam shaft.

It is common for repairmen to compress the valve springs with a screwdriver or other similar tool. The tip of the screwdriver is applied to the top of the valve spring and the opposite end of the screwdriver is then forced toward the body of the cam shaft to apply pressure to the side of the cam shaft, using the cam shaft as a fulcrum to apply downward pressure on the spring with the tip of the screwdriver. The use of a screwdriver in this way to compress the valve springs has been a recommended procedure in a service manual published by an automobile manufacturer.

The use of the cam shaft body as a pressure point for applying sufficient force to depress the valve springs can have serious consequences. A cam shaft is made from cast iron and is relatively ductile. A tool forced against the cam shaft can score the cam shaft which can weaken it or even lead to fracturing of the cam shaft during use.

The present invention provides apparatus for removing rocker arms in which the valve springs can be compressed without contacting the cam shaft or any other critical moving part of the automobile engine. The apparatus of this invention also facilitates quick and easy removal of the rocker arms as well as the valve springs, and can provide a substantial saving of time required to remove and replace the valves, valve springs and rocker arms.

SUMMARY OF THE INVENTION

Briefly, the present invention provides apparatus for removing a rocker arm of a cam shaft-activated valve mechanism in an engine, in which a valve spring is biased into engagement with a rocker arm to urge the rocker arm toward the cam shaft. The apparatus comprises an elongated sleeve having a working face at a first end and a second end spaced longitudinally from the first end of the sleeve. An elongated leverage arm pivots about a transverse axis through the sleeve adjacent the second end of the sleeve. A first portion of the leverage arm projects away from one side of the transverse axis, and a second portion of the leverage arm projects away from the opposite side of the transverse axis. The first portion of the leverage arm is engageable with a fixed support spaced laterally from the transverse axis so that fitting the working face of the sleeve over a valve spring and applying force to the second portion of the leverage arm, at a point spaced from the transverse axis, can move the working face of the sleeve in the direction of the applied force, against the bias of the valve spring, to compress the spring sufficiently to facilitate removing the rocker arm.

In one form of the invention, the working face of the sleeve is generally U-shaped, and an elongate slot formed in a side of the sleeve enables the sleeve to be slipped sideways around a portion of the rocker arm so that the working face of the sleeve can fit over the valve spring.

In another form of the invention, a force-receiving member is positioned adjacent the valve spring and rocker arm. The force-receiving member serves as a fulcrum against which the first portion of the leverage arm is pressed to allow the sleeve to move in the direction of a force applied to the second end of the leverage arm. The force-receiving member can comprise a cross-bar held in a position substantially parallel to the cam shaft by brackets which are rigidly secured to the cylinder head of the engine.

These and other aspects of the invention will be more fully understood by referring to the following detailed description and the accompanying drawings.

DRAWINGS

DETAILED DESCRIPTION

Figure 1:
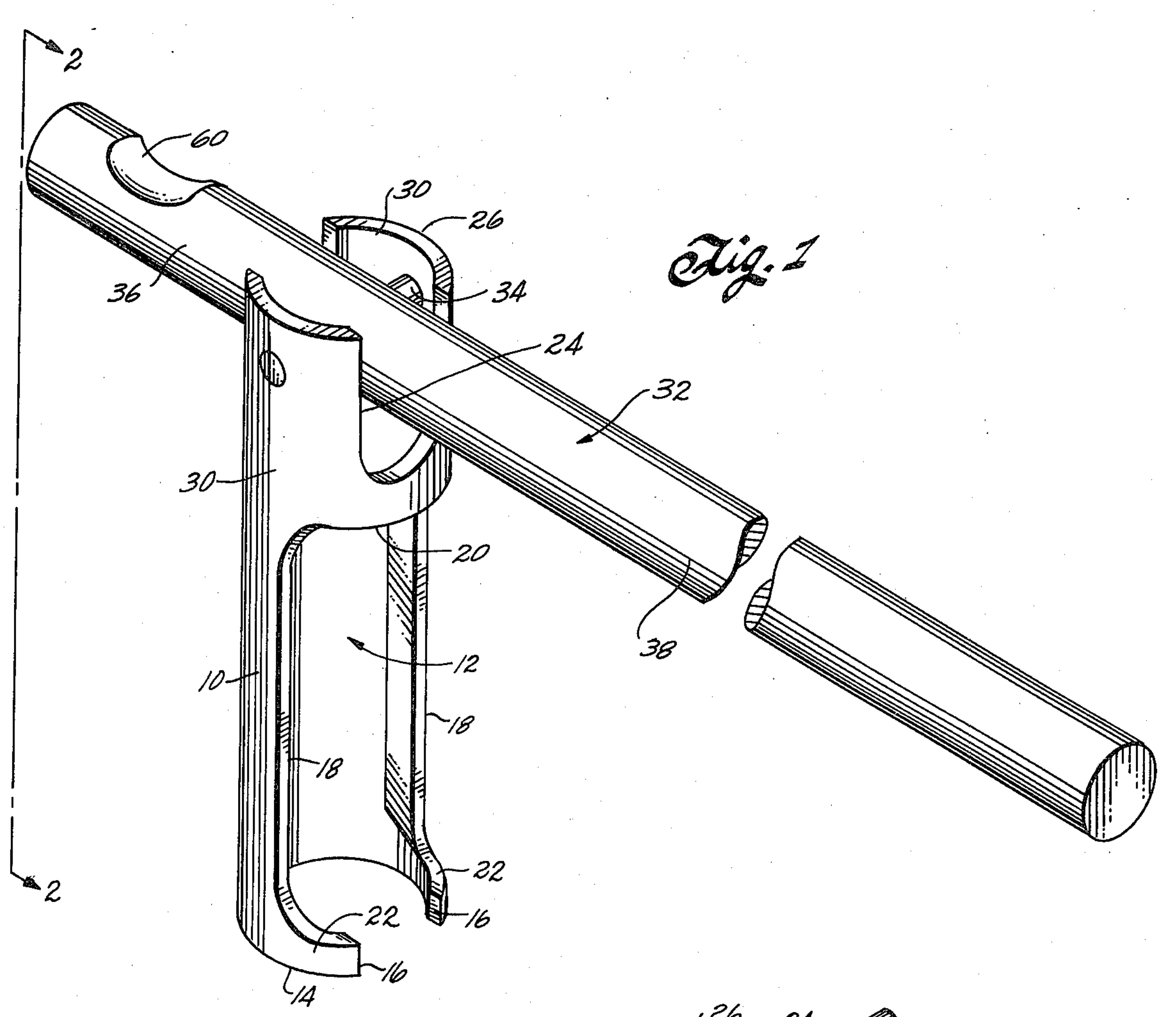
FIG. 1 is a fragmentary, perspective view showing a tool for compressing a valve spring to facilitate removing a rocker arm in accordance with principles of this invention.
Figure 2:
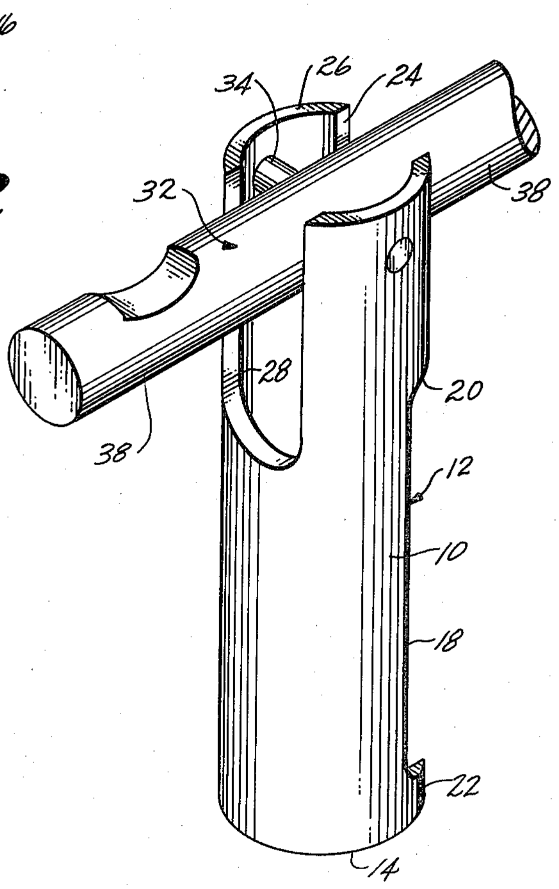
FIG. 2 is a fragmentary, perspective view taken on line 2—2 of FIG. 1.

FIGS. 1 and 2 show a valve spring-compressing tool which includes a force-applying member comprising an elongated open-ended tubular sleeve 10 having a circular cross-section. An elongated slot 12 is formed in a side wall of the sleeve and opens through an annular working face 14 at a first end of the sleeve. The slot 12 includes a narrow portion bounded by straight opposite short faces 16 which extend inwardly and parallel from the working face 14. The short faces 16 extend inwardly for a short distance to a point where the width of the slot is enlarged above the faces 16. The wider portion of the slot has a width about equal to the diameter of the sleeve. The wider portion of the slot is bounded by a pair of opposed and parallel long faces 18 which extend for a major portion of the length of the sleeve along opposite sides of the sleeve. The slot 12 terminates at an annular lateral face 20 which connects the long faces 18 of the slot 12. The lateral face 20 extends across the sleeve at about two-thirds the distance from the working face 14.

The slot 12 thus provides a generally U-shaped or C-shaped working face 14 at the first end of the sleeve which provides a pair of projecting fingers 22 at the base of the slot 12. The wider portion of the slot provides access from the side of the sleeve to the hollow interior extending through the sleeve.

A U-shaped front slot 24 is formed in the opposite or second end 26 of the sleeve. The U-shaped front slot 24 opens through the second end of the sleeve and extends lengthwise above the portion of the sleeve wall in which the slot 12 is formed. Thus, the first slot 24 is above the opening formed between the edges of the fingers 22.

A U-shaped rear slot 28 extends inwardly from the second end 26 of the sleeve on the side of the sleeve opposite the first slot 24. Both U-shaped slots 24 and 28 open upwardly as shown in FIGS. 1 and 2, and the rear slot 28 is longer than the front slot 24. The front and rear slots form opposed ears 30 projecting from the opposite sides of the sleeve at the second end of the sleeve.

An elongated leverage arm 32 pivots about a transverse axis between the ears 30. A transverse pivot pin 34 is secured to the ears on opposite sides of the leverage arm 32. The pivot pin 34 extends through an intermediate portion of the leverage arm. A short first portion 36 of the arm projects from one side of the sleeve and the transverse axis through the pivot pin 34. A longer second portion 38 of the arm projects from an opposite side of the sleeve and the transverse axis through the pivot pin 34. The front and rear slots 24 and 28 provide clearance for allowing the leverage arm 32 to pivot through a relatively wide angle about the transverse axis through the pivot pin 34. The axis through the pivot pin is perpendicular to the longitudinal axis of the sleeve, and the longer second portion 38 of the leverage arm projects outwardly above the opening between the fingers 22 at the working face 14 of the sleeve.

Figure 3:
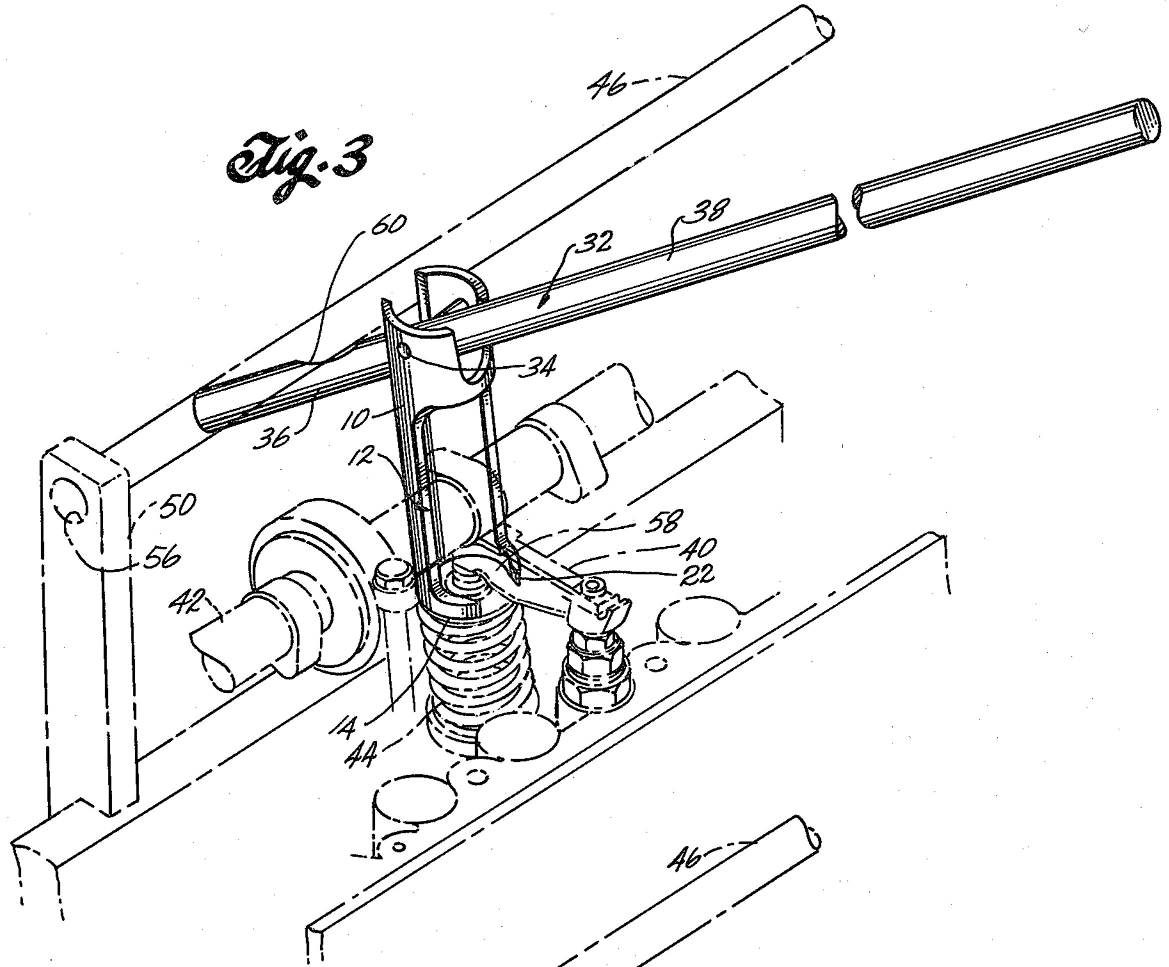
FIG. 3 is a fragmentary, perspective view showing the tool of FIGS. 1 and 2 in use with a cross-bar prior to applying downward pressure to a valve spring.
Figure 4:
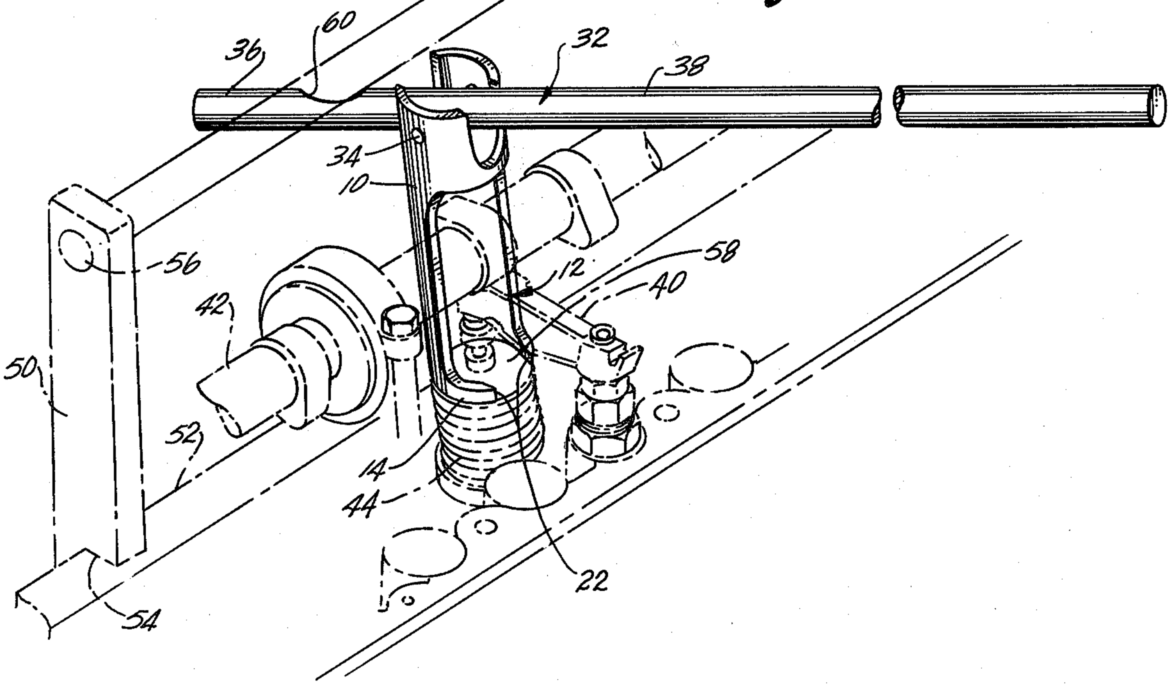
FIG. 4 is a fragmentary, perspective view similar to that of FIG. 2, showing the tool pressed against the cross-bar to depress the valve spring.

FIGS. 3 and 4 illustrate use of the spring compressor tool for moving a rocker arm 40 of a valve system in an overhead cam engine having a cam shaft 42 for activating the rocker arm, and a valve spring 44 below the rocker arm for urging the rocker arm toward the cam shaft. FIG. 3 shows the valve spring 42 in its normal uncompressed condition urging the rocker arm 40 toward the cam shaft 42.

For removing the rocker arm, a force-receiving member 46 is initially secured in a fixed position adjacent the valve spring 44, and leverage is applied to the force-receiving member 46 by the leverage arm 32 to compress the spring. The force-receiving member 46 comprises part of a cross-bar arrangement which includes a pair of longitudinally spaced apart cross-bar brackets 50 (only one is shown in FIGS. 3 and 4) which can be releasably fixed to an edge 52 of the cylinder head. The bottom portion of each bracket 50 includes an opening (not shown) for receiving a bolt (not shown) for being threaded into cooperating threaded openings (not shown) in the cylinder head. The bolts can be tightened to hold the brackets 50 in a fixed upright position on the cylinder head. Each bracket can have a right angle slot 54 near its bottom for engaging a cooperating right angle edge 52 of the cylinder head. Alternately, the brackets can be straight and can be secured directly to the upright, outside face of the cylinder head.

A top portion of each bracket 50 has a circular bore 56 for slideably receiving the force-receiving member 46. The bores 56 are aligned longitudinally when the brackets 50 are secured in place so that the force-receiving member 46 can be slid longitudinally through the collinear openings 56. The brackets stand sufficiently above the top of the cylinder head so that the force-receiving member 46 is positioned above the cam shaft 42 as well as the rocker arm 40 and the valve spring 44. The force-receiving member 46 is held in a position spaced laterally from the valve spring 44 and extending generally parallel to the axis of the cam shaft.

The sleeve 10 is then placed over the valve spring 44 so that the working face 14 of the sleeve bears against a plate 58 which typically covers the top of the valve spring 44. The slot 12 in the side of the sleeve 10 allows the sleeve to be slipped sideways around the rocker arm and the locknut above the valve spring plate 58. When the sleeve is in place above the valve spring, the fingers 22 extend around the major portion of the plate above the valve spring to provide a substantial working surface area of contact between the sleeve 10 and the valve plate 58. The major portion of the slot 12 in the sleeve 10 provides clearance for the sleeve adjacent the cam shaft 42 and the rocker arm 40. The slot enables a portion of the cam shaft and the rocker arm to extend into the hollow interior of the sleeve when the sleeve is in place above the valve spring 44.

The first portion 36 of the leverage arm 32 is then extended under the force-receiving member 46. A cylindrically curved recess 60 in the leverage arm fits around the matching contour of the force-receiving member. A downward force is then applied to the second portion 38 of the leverage arm, as illustrated in FIG. 4. This forces the first portion 36 of the leverage arm upwardly against the undersurface of the fixed force-receiving member 46 which resists continued upper force applied to it by the leverage arm. Thus, the force-receiving member acts as a fixed fulcrum and continued downward force on the leverage arm moves the sleeve 10 downwardly against the top of the valve spring 44 to compress the spring. The slot 12 in the sleeve is sufficiently long to move downwardly and still clear the cam shaft.

FIG. 4 shows the valve spring being compressed by the sleeve. The leverage arm can be easily held in the position shown in FIG. 4 to maintain the valve spring compressed while the rocker arm is slipped out from under the cam shaft. The leverage arm also can be held in the position shown in FIG. 4 to maintain the valve spring compressed while the locknut above the valve spring and the valve spring plate 58 are removed so that the valve spring then can be removed.

The spring compressor tool also can be used when reassembling the valve system. The sleeve can be used to depress the valve spring in advance of applying the spring plate 58 and the spring locknut. The assembled valve spring then can be maintained in a compressed condition while the rocker arm 40 is replaced.

The apparatus of this invention makes it possible to disassemble all valves in the cylinder head relatively quickly and easily. The force-receiving member 46 extends for a major length of the cylinder head, and the force-receiving member can be slid lengthwise in either direction along the length of the head. Thus, while the force-receiving member is in place, the cam shaft 42 can be rotated about its axis step-wise and the spring compressor tool can be used to compress each valve in succession and quickly remove the rocker arm and the valve spring so that the entire job of removing the valves can be accomplished in a matter of minutes. The apparatus of this invention provides a reliable means for maintaining a strong force on each valve spring to hold the valve spring in its compressed condition while avoiding any contact with the body of the cam shaft, or any other critical moving parts of the engine.

I claim:

1. Apparatus for removing a rocker arm of a cam shaft-activated valve mechanism in an engine cylinder head, in which a valve spring is biased into engagement with the rocker arm to urge the rocker arm toward the cam shaft, the apparatus comprising:

an elongated force-applying member having a working face at a first end thereof and a second end spaced longitudinally from the first end;

an elongated leverage arm having a first portion and a second portion;

means pivoting an intermediate portion of the leverage arm about a transverse axis of the force-applying member adjacent the second end thereof, the first portion of the leverage arm projecting away from one side of the transverse axis, the second portion of the leverage arm projecting away from an opposite side of the transverse axis;

an elongated force-receiving member;

at least a pair of support brackets each having means for being releasably secured in a fixed upright position on an engine cylinder head, each bracket being movable independently of the other bracket; and means for slidably securing the force-receiving member to each bracket, each bracket being movable along the length of the force-receiving member independently of the other bracket, the brackets providing means for holding the force-receiving member in a fixed position spaced from the transverse axis of the force-applying member when the brackets are secured to the spaced apart locations on the cylinder head, the force-receiving member being slidable longitudinally relative to the fixed support brackets;

the first portion of the leverage arm being releasably engageable with the force-receiving member so that fitting the working face of the force-applying member over a valve spring and applying force to the second portion of the leverage arm causes the force-receiving member to resist such force to move said working face against the bias of the valve spring to compress the spring sufficiently to facilitate removal of the rocker arm.

2. Apparatus according to claim 1 in which the force-applying arm comprises a sleeve; and in which said transverse pivot axis is aligned longitudinally with the working face of the sleeve.

3. Apparatus according to claim 1 in which the force-applying member comprises a sleeve having a tubular wall defining an internal passage extending inwardly from the working face of the sleeve; and including a slot formed in the wall of the sleeve and opening through a portion of the working face so the working face is generally U-shaped to facilitate slipping the sleeve sideways over the valve spring and around the rocker arm to accommodate the rocker arm in the passage of the sleeve.

4. Apparatus according to claim 3 in which the slot extends for a major portion of the length of the sleeve.

5. Apparatus according to claim 4 in which a major portion of the length of the slot is recessed in the wall of the sleeve more than the portion of the slot adjacent the working face to form a pair of opposed projecting fingers at the working face.

6. Apparatus according to claim 3 in which the opening of the U-shaped working face faces toward the second portion of the leverage arm.

7. Apparatus according to claim 6 in which the second portion of the leverage arm is longer than the first portion.

8. Apparatus according to claim 1 in which the engine has a cam shaft with a longitudinal axis of rotation; and including means for holding the force-receiving member in a position spaced above and laterally from and parallel to the cam shaft axis of rotation.

* * * * *